United States Patent [19]

Shields

[11] Patent Number: 4,641,427

[45] **Date of Patent: * Feb. 10, 1987**

[54] METHOD AND APPARATUS FOR APPLYING TWO PIECE CONNECTOR BLOCKS TO MULTICONDUCTOR CABLE

[76] Inventor: Charles E. Shields, 655 Woodland, Crystal Lake, Ill. 60014

[ * ] Notice: The portion of the term of this patent subsequent to Apr. 8, 2003 has been disclaimed.

[21] Appl. No.: 756,503

[22] Filed: Jul. 19, 1985

Related U.S. Application Data

[63] Continuation of Ser. No. 351,595, Feb. 23, 1982, Pat. No. 4,580,340.

[51] Int. Cl.[4] ........................ H01R 43/04; B23P 19/00

[52] U.S. Cl. ........................................ 29/857; 29/749; 29/861; 29/564

[58] Field of Search .............. 29/857, 749, 757, 564.4; 83/42, 732, 413, 649, 650; 242/55, 29

[56] References Cited

U.S. PATENT DOCUMENTS 4,110,880 9/1975 Peppler .
4,281,442 8/1981 Senior et al. .
4,344,225 8/1982 Johnson, Jr. et al. .
4,380,117 4/1983 Brandewie et al. .
4,409,734 10/1983 Baraglia et al. .
4,439,919 4/1984 Cheh et al. .

*Primary Examiner*—Howard N. Goldberg
*Assistant Examiner*—Carl J. Arbes
*Attorney, Agent, or Firm*—H. Duane Switzer

[57] ABSTRACT

A method and apparatus is provided for attaching a plurality of two-piece connectors of varying configuration to a specified length of multi-conductor cable at precise locations along the length of the cable and in any sequence of connector attachment. A device is provided for storing and downwardly advancing a precise length of cable, cutting one end of the cable at a cutter station, and locating the cable between a connector assembly station where a pair of connector halfs are automatically attached to the cable at a precise, predetermined location. The cable is then laterally moved to one or more connector assembly stations where one or more additional connectors are attached to the cable. The cable is then moved back to the cutter station where the cable is cut flush against the top of the last connector to be attached to the cable. All drive and movement functions of the apparatus are controlled by a pre-programmed microprocessor.

25 Claims, 7 Drawing Figures

METHOD AND APPARATUS FOR APPLYING TWO PIECE CONNECTOR BLOCKS TO MULTICONDUCTOR CABLE

This application is a continuation of application Ser. No. 351,595, filed 2/23/82, now U.S. Pat. No. 4,580,340.

BACKGROUND OF THE INVENTION

FIELD OF THE INVENTION

The invention relates to a machine and the method for using the machine to apply two-piece connector blocks at specifically defined points on a precise length of multiple conductor cable.

DESCRIPTION OF THE PRIOR ART

In the electronics industry and computer field, and particularly in the field of minicomputers and microcomputers, it is necessary to utilize multiple lines or busses interconnecting several different elements on the same line as related equipment relys more and more on mass termination technique for interconnections between and among components. For example, it may be necessary to have a sixteen conductor cable for providing a sixteen conductor bus for communicating between a central data processing unit, a peripheral memory, and peripheral data monitoring devices. Such cables may also form a bus providing a coupling between a CPU, an address, a RAM and a ROM. In such use, the conductor cable requires a plurality of intermediate connectors at precise locations along the cable length to connect to elements of equipment in a specific geometric arrangement in the cabinet.

Typically, such a mass termination multiple conductor cable is a flat cable including a plurality of conductors (e.g., sixteen) in a parallel, standardized spaced array in the cable and embedded in or surrounded by flexible plastic insulating material. Also, to minimize the pickup of noise, an electrical shield (typically wire mesh or screen-type conductor) is placed over the insulated array of conductors and an insulating surface coating is applied over the electrical sheidl. Additionally, above the insulated plurality of conductors and in contact with the electrical shield there is usually positioned a system ground or system common conductor.

For particular assemblies which are produced in substantial quantities, large amounts of multi-conductor cable are required, having a precise length and having two or more connectors disposed at precise locations along each cable length, with at least one connector located at each end of the cable. In a typical application, the various connectors may be of different configurations for interfacing with different types or makes of equipment.

The connector blocks are produced in two mating pieces, and are adapted to be applied with the cable "sandwiched" between the connector half. Each connector has an elongate slot therein, and within the connector are a plurality of spaced apart contacter pins. These pins are spaced apart the same distance that the conductors in the cable are spaced from each other. Also, the first contacter pin is spaced a predetermined distance from one edge of the slot in the connector. When the connector half is properly positioned adjacent the cable, an actuator is operated to press the connector pins through the plastic cable layer and into contact with the individual conductors in the cable. The copper conductor is captured by the pins without shorting other wires. In the cable with which the present invention is adapted to be used, a plurality of connectors, several of which are of differing configurations, must be applied to the cable at precise locations along the cable length, with the proper type of connector being applied at its specified location. A connector may be male or female, and have front or side facing locations.

Prior methods for applying a plurality of connectors to a multi-conductor cable include manual operations. Manual operations are severly labor intensive, wherein the following procedure is currently in common practice.

(a) Cut the multi-conductor cable to length.
(b) Measure and mark locations for each connector along the cable length.
(c) Place one connector half in its proper position.
(d) Place the other connector half in position adjacent the one connector half, with the cable between the connector halfs.
(e) Place the connector halfs and cable in a fixture.
(f) Using an arbor press or a pneumatic press, apply pressure to the connector halfs until they are staked together and the connector pins have penetrated the insulation layer of the cable.
(g) Repeat the last four steps for each connector.

It is apparent that the cost of producing substantial numbers of cable and connector assemblies in this manner can be quite costly in terms of direct labor.

Additionally, it is common that connectors are locted in an "up" or "down" position in relation to others on a cable assembly, or that different types of connectors are utilized on the same cable assembly. In the latter circumstances, difference fixtures would be required to attach each type of connector to the cable assembly.

In addition, machines are utilized which advance the cable horizontally past a plurality of horizontally disposed stations where the cable is stopped and a connector attached. Such machines do not provide means for reversing the direction of the cable, which precludes the application of a previously applied type of connector at a point further along the length of the cable. In such devices, the catanary effect on the horizontally moving cable may affect the ability to precisely apply the connector at its specific location.

As will be described in greater detail hereinafter, the method and machine of the present invention enable one to precisely apply a plurality of connectors, of any desired type and in any desired array, to a length of multiconductor cable at precise locations along the cable length, and to prepare a plurality of identical cable segments with the same selected connectors mounted at the desired location along the length of each segment.

SUMMARY OF THE INVENTION

According to the present invention there is provided a method and apparatus for attaching two-piece connectors of varying configuration to a specified length of multi-conductor cable at precise locations along the length of the cable and in any given sequence of connector attachment. In particular, the invention provides a method for continuously and automatically forming cable assemblies, whereby each cable assembly comprises a precise length of a flat multi-conductor cable and at least two two-piece connectors attached to the cable at precise locations along the length of the cable, the method comprising the steps of: feeding the cable downwardly from a cable supply reel to a cutter station; cutting the lower end of the cable to establish a precisely located first end of the cable; feeding the cable downwardly by a first given distance from the level of the end of the cable; moving the cable laterally to a first connector feed assembly station; attaching a first two-piece connector on the lower end of the cable at the first connector feed assembly station, feeding the cable downward a second given distance from the first two-piece connector; attaching a second two-piece connector to the cable; moving the cable supply laterally to the cutter station; and cutting the cable flush with the upper edge of the second two-piece connector.

The invention also provides an apparatus for continuously and automatically forming cable assemblies, whereby each cable assembly comprises a precise length of a flat multi-conductor cable and at least two two-piece connectors attached to the cable at precise locations along the length of the cable, the apparatus including a first drive motor to feed the cable downwardly from a cable supply reel to a cutter station, a blade assembly to cut the lower end of the cable to establish a precisely located first end of the cable, a second drive motor to move the cable laterally to a first connector feed assembly station after the cable has been moved downwardly by the first drive motor a first given distance from the level of the end of the cable, connector feed devices at the first connector feed assembly station for attaching a first two-piece connector on the lower end of the cable at the first connector feed assembly station, a second connector feed assembly station for attaching a second two-piece connector to the cable after the cable has been fed downwardly a second given distance from the first connector by the first drive motor and the cable has also been moved laterally by the second drive motor to the second connector feed assembly station, the cutter station adapted to cut said cable flush with the upper edge of the second two-piece connector after the first drive motor has fed the cable downward a third given distance and the second drive motor has moved the cable laterally to the cutter station.

DESCRIPTION OF THE PREFERRED EMBODIMENT

Figure 1:
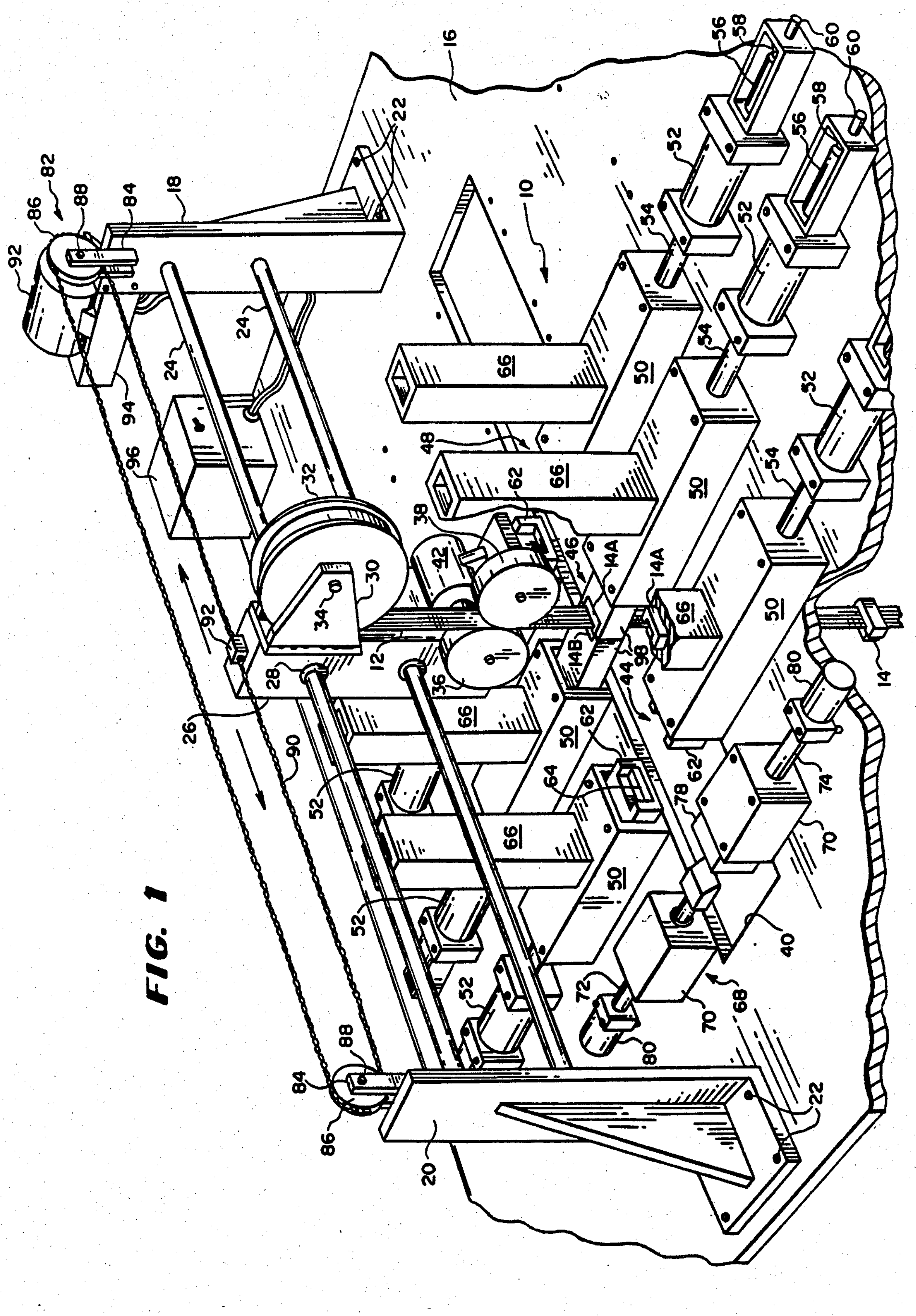
FIG. 1 is a perspective view of the machine of the present invention showing the various stations at which a plurality of connectors are applied to a multi-conductor cable, and the means for moving the cable between the various stations and ultimately to a cut-off station.
Figure 2:
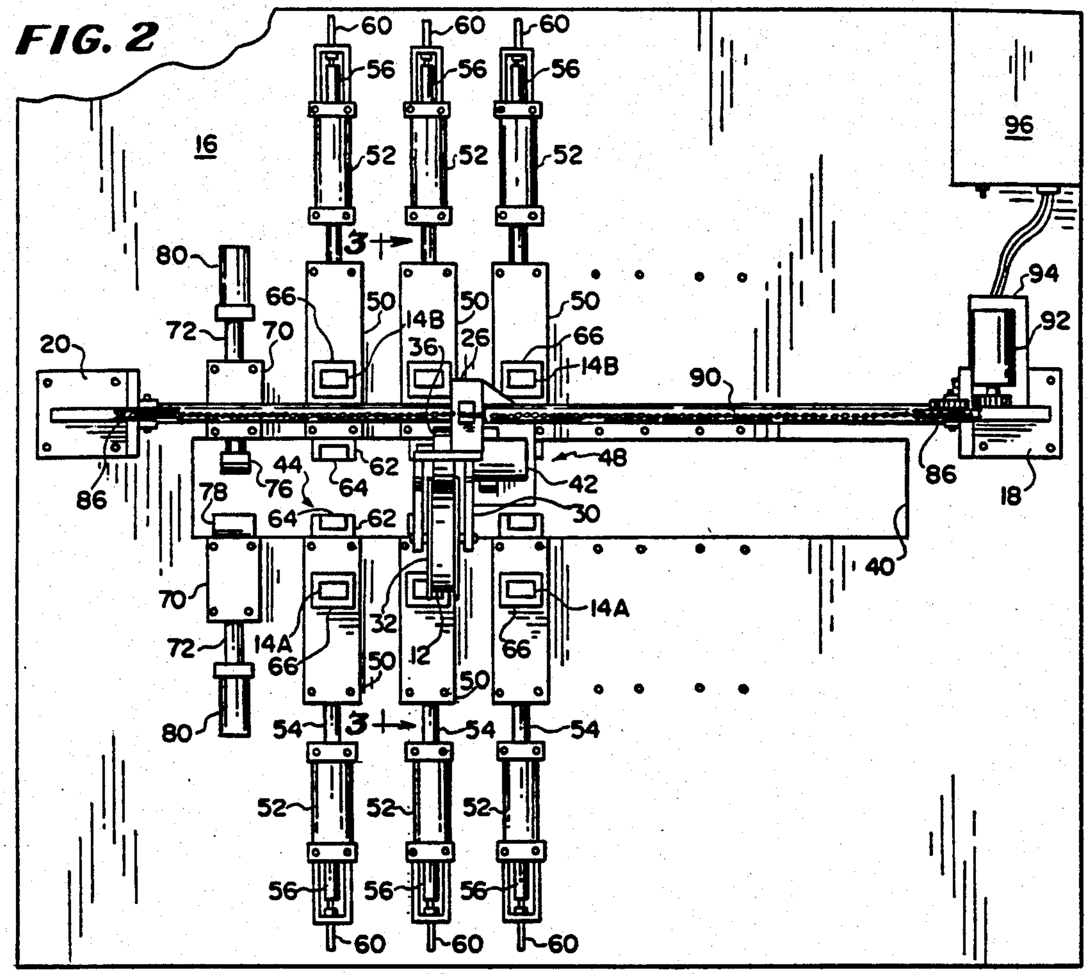
FIG. 2 is plan view of the machine illustrated in FIG. 1.
Figure 3:
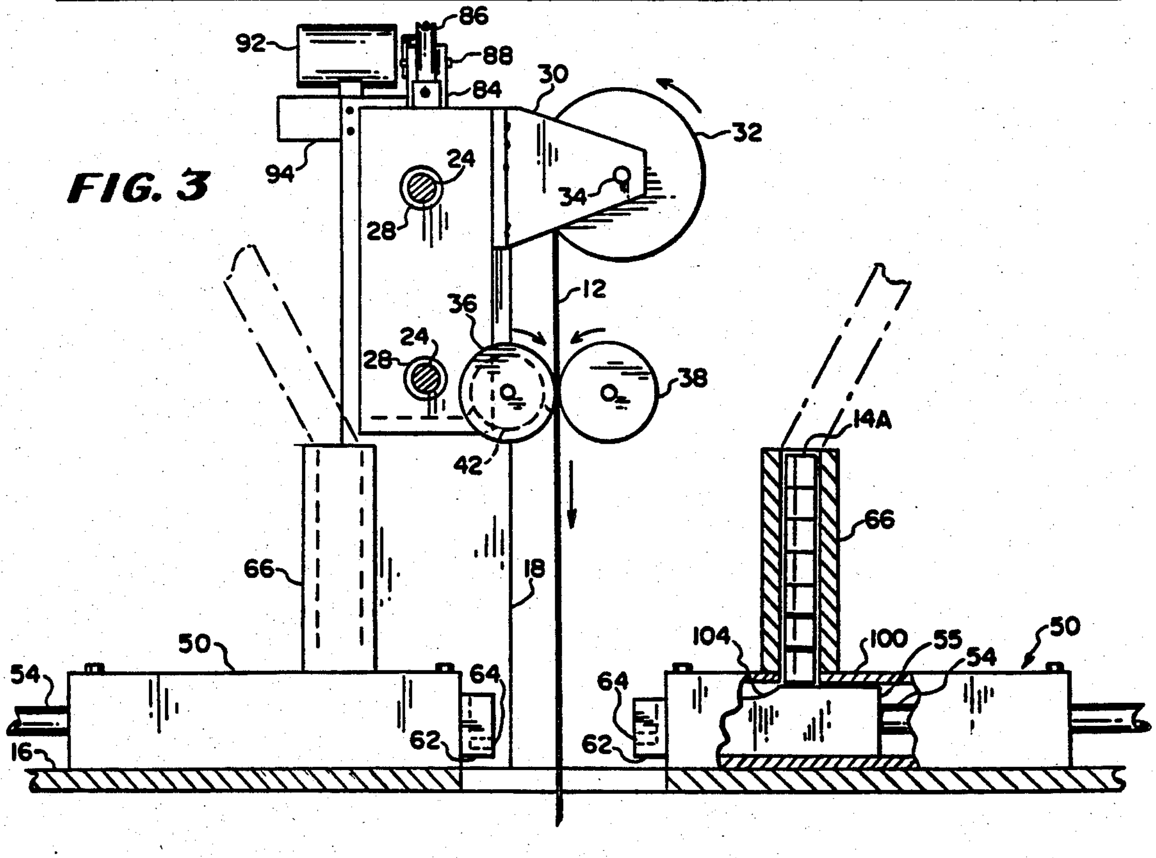
FIG. 3 is a partial sectional and cut-away view of the machine illustrated in FIG. 2 taken along the line 3—3, in particular showing the relationship between the reel of multi-conductor cable, the cable itself, and the connector half feed devices disposed on either side of the cable.

Referring now to the drawings in greater detail, there is illustrated in FIG. 1 a machine 10 constructed in accordance with the teachings of the present invention. As will be described below, the machine 10 is particularly adapted for feeding a multi-conductor cable 12 past a plurality of stations where connectors 14 are applied to the cable 12 at precisely defined locations. The machine 10 is adapted to apply the connectors 14 to both ends of cable 12, and at any intermediate point along the cable length.

The connectors 14 comprise two halfs, 14A and 14B. Each connector 14 has a slot therein for receiving the length of cable 12, and a plurality of pin-type contacters therein which, when the cable 12 is sandwiched between the connector halves 14A, 14B, are caused to penetrate the insulation surrounding cable 12 and into electrical contact with the plurality of conductors within the cable 12.

The machine 10 is mounted on a flat support surface 16 and includes two upstanding, opposed mounting plates 18, 20 which are firmly attached to support surface 16 by means of bolts 22. A pair of rods 24 extend between mounting plates 18 and 22, and provide a track for horizontal movement of cable mounting plate 26 in the directions shown by arrows A—A in FIG. 1. Bushings 28 provide ease of movement of mounting plate 26 along rods 24.

A pair of brackets 30 extend laterally from cable mounting plate 26, and a reel 32 with built-in tension control is rotatably mounted on a pin 34 extending between the brackets 30. Multi-conductor cable 12 is carried by reel 32, and the cable 12 extends downward, under the influence of gravity, from reel 32 past two opposed cable feed rollers 36, 38 and through a large slot 40 in support surface 16. Feed roller 36 is selectively driven by motor 42 which is mounted on support surface 16. Roller 38 is an idler roller, but is so disposed that driving contact is provided to cable 12 as it passes between roller 36 and roller 38. For purposes to be explained, motor 42 is precisely controlled to drive cable 12 downward at specified increments such that connectors 14 can be applied to cable 12 at precise, pre-selected locations along the length thereof.

A plurality of piston or ram operated connector feed assemblies 44, 46, 48 are positioned at a plurality of stations along opposing sides of slot 40 and on support surface 16. In the disclosed embodiment, three connector feed assemblies are illustrated, but it is to be understood that any number of similar assemblies can be utilized in keeping within the teachings of the present invention.

Figure 4:
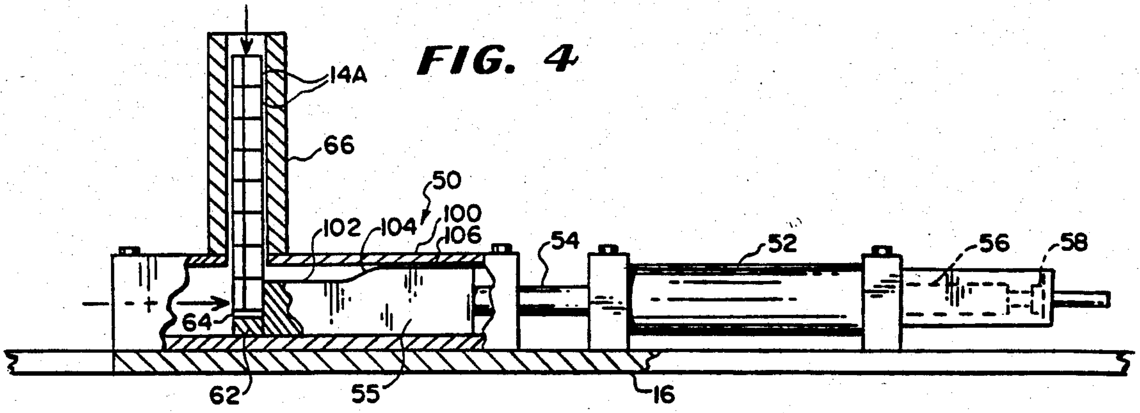
FIG. 4 is a detail, partial cut-away view of one of the connector half feed devices forming part of the present invention, shown in its position ready to feed a connector half into attachment on the multi-conductor cable.

Each connector feed assembly 44, 46, 48 includes a pair of opposed ram-type feed devices 50, wherein each pair of opposed feed devices 50 defines a station for the application of a connector 14 to cable 12. Pneumatic drive devices 52 are operatively connected to each ram-type device 50 for advancing rods 54 forward and towards each opposing counterpart rod 54. Each rod 54 moves a piston member 55 located within device 50 (FIG. 4). The pneumatic drive devices 52 are selectively controlled by solenoids 56, which include manually adjustable spacers 58 to adjust the length of stroke of each rod 54. Air under pressure is supplied to each pneumatically driven device 52 through conduit 60.

The forward end of each piston member 55 includes a head 62 which is adapted to hold an interchangeable insert 64, which is manually placed in head 62 depending upon the outside configuration of the connector 14 which is being applied to cable 12 at the specific station. Opposed heads 62 are adapted to be moved towards each other by feed devices 50, in the manner illustrated by connector feed assembly 46 in FIG. 1.

A connector feed magazine 66 is disposed atop each feed device 50, and holds a plurality of connector halfs 14A or 14B in a vertical array above feed device 50. In the present invention, each magazine 66 on one side of slot 40 will hold one half (14A) of a connector assembly, while the opposing magazine will hold the other half (14B) of the same connector assembly. Feed devices 50 are adapted, when solenoids 56 are actuated, to sequentually place a connector half in insert 64 of head 62. As piston 55 is driven rearward, the subsequent connector half 14A or 14B in the vertical array in magazine 66 drops into insert 64. As rod 54 is then driven forward, opposing heads 62 meet and force connector halves 14A and 14B into mating relation and into electrical contact with the conductors inside cable 12.

An automatically controlled cutter head assembly 68 is located at one end of slot 40 adjacent the array of stations comprising connector feed assemblies 44, 46 and 48. Cutter assembly 68 comprises a pair of opposed piston rod housings 70, each having a piston rod 72, 74 slidably extending therethrough. At the end of rod 72 is a flat bottomed cutting blade 76, and at the opposed end of rod 74 is a bearing block 78. As will be described, when it is desired to cut a length of cable 12 with connectors 14 attached from reel 32, the cable is moved between blade 76 and bearing block 78. A pair of solenoids 80 are actuated which drive blade 76 and bearing block 78 towards each other, thereby cutting cable 12. Because of the flat bottom of blade 78, cable 12 is cut flush with the upper surface of the last, or end connector 14 applied to cable 12.

To move cable mounting plate 26 laterally along rods 24, a chain drive mechanism 82 is provided which comprises a pair of mounting brackets 84 extending from each mounting plate 18, 20. A pair of pulleys 86 is mounted on a pin 88 between each pair of brackets 84, and a chain 90 extends over the pulleys and between mounting plates 18, 20. The chain 90 is securely fastened to block 92, which is fixed to the top of cable mounting plate 26.

One pulley 86 is driven by a step motor 92 mounted on a platform 94 fixed to mounting plate 18. Step motor 92 is controlled by a microprocessor control device 96 whereby the precise lateral location of cable 12 is controlled by microprocessor 96 and step motor 92. An air cylinder and associated control device can be used in place of step motor 92 within the scope of the present invention to drive chain 90.

Microprocessor 96 also controls cable feed motor 42, solenoids 56, and cutter solenoid 80 through suitable electrical connections (not shown). Thus, the entire operation of the disclosed machine can be pre-set to produce large quantities of multi-conductor cable with connectors attached all in precisely the same location on each cable.

Figure 5:
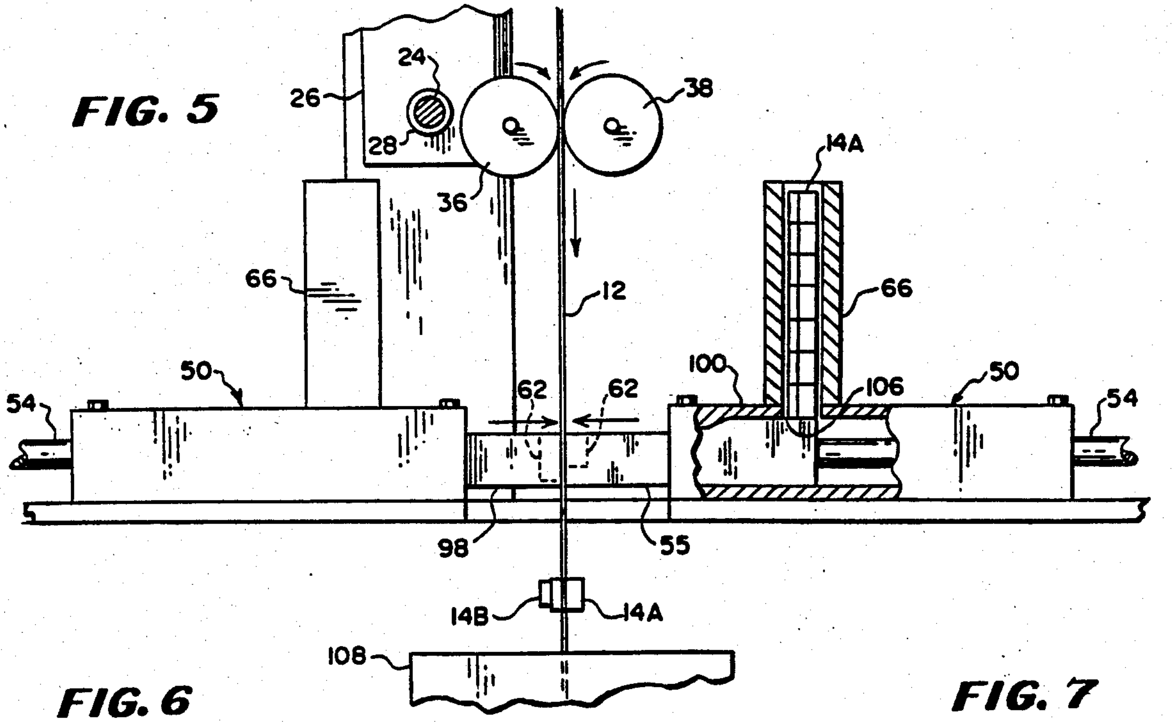
FIG. 5 is a detail, partial cut-away view of two opposed connector half feed devices, showing the position of each when a pair of connector halfs are being attached to a multi-connector cable.

Referring to FIGS. 4 and 5, the details of ram type feed devices 50 are illustrated. Each ram device includes a piston member 55 which slides in a housing 100 under the control of rod 54 and pneumatic drive device 52. Ram head 62 forms the forward part of piston 55, and is adapted to hold inserts 64 corresponding to the outer configuration of connector halfs 14A aligned in magazine 66. The upper surface of piston 55 comprises a cut-out portion 102 which terminates at a curved face 104 of piston 55. Each opposing ram device is constructed in the same manner, and opposing magazines 66 store connector halfs 14B.

Figure 6:
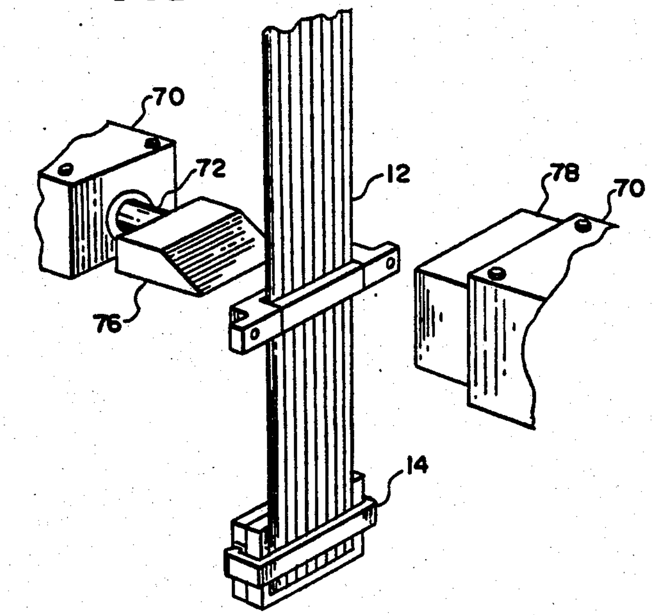
FIG. 6 is a perspective view of the cutter blade and bearing block forming part of the present invention, showing each in its position prior to cutting the cable with connectors attached.

In the operation of the disclosed invention, to be more fully explained below, piston 55 is driven to the left, as viewed in FIGS. 5 and 6, by rod 54 and pneumatic drive device 52. As insert 64 passes beneath magazine 66, the bottommost connector half 14A drops into the insert 64. Cut-out portion 102 is so designed that only one connector half 14A drops into insert 64. As piston 55 continues its movement leftward, the next connector half 14A in magazine 66 rides on the upper surface of cut-out portion 102 and rides on curved portion 104 of piston 55. When piston 55 has completed its leftward movement, and is in position to attach connector 14A to cable 12 and corresponding connector half 14B, as shown in FIG. 6, subsequent connectors 14A ride on the outer surface 106 of piston 55. When piston 55 is withdrawn to the right in the position shown in FIG. 5, the next connector half 14A drops into insert 64 under the influence of gravity and the cycle is repeated.

Pneumatic drive devices 52 are controlled by solenoids 56, as previously described. Each solenoid 56 includes an adjustable spacer unit 58. By adjusting spacer unit 58, the length of stroke of piston 55 can be varied to correspond to the thickness of the various connectors which are disposed in magazines 66.

In operation, magazines 66 are each filled with the selected connector halves 14A, 14B, to be applied to cable 12, and the appropriate cable 12 is inserted on reel 32. Also, inserts 64 corresponding to the outer configuration of connector halfs 14A and 14B are placed in ram heads 62. Next, microprocessor 96 is initially programmed to (1) operate motor 42 such that a desired length of cable 12 is fed from reel 32; (2) operate motor 92, in forward and reverse, according to the sequence in which the varied connectors 14 are to be applied to cable 12; (3) actuate solenoids 56 in the proper sequence when cable mounting plate 26 has moved reel 32 and cable 12 adjacent the desired ram head 62 and appropriate connector 14; and (4) actuate solenoids 80 when the cable 12 has reached its proper length and the end connector 14 has been applied to the cable 12.

The microprocessor 96 operates the machine 10 in the following manner. Initially, to establish the uniformity of length of each cable produced by machine 10, motor 42 is actuated to feed cable 12 between feed rollers 36, 38 and through slot 40 under the influence of gravity. The cable 12 extends only a short distance beneath slot 40 for this initial operation. Motor 92 is then actuated to move cable mounting plate 26 along rods 24 until cable 12 is adjacent cutting blade 76. Solenoids 80 are then actuated, whereby the portion of cable 12 extending below slot 40 is cut off as blade 76 moves toward bearing block 78. The production of large quantities of multi-conductor cable of uniform length, with connectors attached can now commence.

To begin the production phase of operation, motor 42 is again actuated by microprocessor 96, or a manual override switch associated therewith, to rotate feed roller 36 and drive cable 12 downward a first precise length from reel 32 and between rollers 36, 38. When the preselected length of cable 12 reaches the point where the first connector 14 is to be applied to the cable, motor 42 automatically stops, and the cable 12 is held firmly between rollers 36, 38. Step motor 92 then drives chain 90 to position cable mounting plate 26 and cable 12 adjacent the connector feed assembly 44, 46, or 48 corresponding to the location where the appropriate magazine 66 is holding the first connector halfs 14A and 14B to be applied to cable 12. When cable 12 is adjacent the proper first connector assembly station, microprocessor 96 stops motor 92. It is apparent from FIG. 1 that motor 92 can drive cable mounting plate 26 in either of the directions designated by the arrows A—A.

After cable 12 is adjacent the selected connector feed assembly 44,46, or 48 the corresponding solenoids 56 on both sides of slot 40 are actuated, causing opposed rods 54 and pistons 55 to move towards each other. As each ram head 62 passes beneath magazine 66, a connector half 14A, is engaged by insert 64 in the ram head 62 and moved towards cable 12.

Simultaneously, the opposed connector half 14B is likewise engaged by opposed insert 64 and moved toward the opposite side of cable 12. As the ram heads 62 meet in the center of slot 40, cable 12 is sandwiched between connector halves 14A and 14B. Continued pressure supplied by pneumatic drive devices 52 pushes the contactor pins in the connector halfs 14A, 14B through the insulation surrounding cable 12 and into contact with the conductors in cable 12. In addition, the two connector halfs are forced together whereby fastening means engage each other and snap into an interconnecting relation. After an appropriate time lag, as determined by microprocessor 96, opposing solenoids 56 are actuated to withdraw pistons 55 and ram heads 62 from contact with each other. Each ram head 62 is then moved into the housing 100 of feed device 50, (FIGS. 4,5) whereby head 62 is moved behind the bottom of magazine 66 to be in position to engage and insert a subsequent connector half. The withdrawal of the ram heads 62 triggers a switch in feed device 50 indicating to microprocessor 96 that a connector 14 has been attached to cable 12.

After the first connector 14 has been attached to the cable 12, microprocessor 96 next signals motor 42 to feed cable 12 downward a second precise length from reel 32, until the preselected cable position for attachment of the subsequent connector 14 is adjacent the line of ram heads 62. Motor 42 is then stopped, and motor 92 is activated to move cable mounting plate 26 along rods 24 until cable 12 is adjacent the connector feed assembly 44, 46, or 48 which has the preselected second connector halfs in magazines 66. Motor 92 is then stopped, and microprocessor 96 functions to actuate solenoids 56 corresponding to the connector feed assembly 44, 46, or 48 in front of which cable 12 has been positioned. Solenoids 56 operate pneumatic drive devices 50 in the manner described above, whereby connector halfs 14A and 14B are removed from their corresponding magazine 66 by ram heads 62 and attached to cable 12 in the same manner as described above.

In like manner, additional connectors 14 are attached to cable 12 by moving cable 12 adjacent the appropriate connector feed assembly, in any desired sequence, to the right or to the left, under the control of motor 92 and microprocessor 96. The operations described above are repeated until the sufficient number of connectors 14, in a predesignated sequence, are attached to cable 12. The present invention permits connectors 14 to be attached to the cable 12 at any point, and in any sequence. The cable 12 can even be operated to attach the same type of connector 14 from the same magazine 66 to the cable at subsequent locations, an operation which is not possible in prior horizontal feed multi-conductor cable assembly devices.

Figure 7:
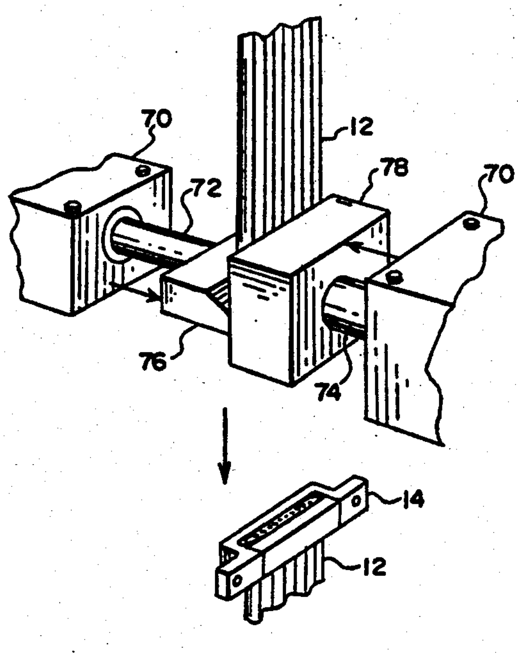
FIG. 7 is a perspective view of the cutter blade and bearing block of the present invention, showing the blade and bearing block in their respective positions after the cable has been cut immediately adjacent the end of the final connector attached to the cable.

After the pre-designated number of connectors 14 have been staked or attached to cable 12, microprocessor 96 sends a signal to motor 92 to drive cable mounting plate 26 laterally whereby cable 12 is stopped directly adjacent cutting blade 76 and bearing block 78. This is best understood by referring to FIGS. 6 and 7. Solenoids 80 are then actuated by microprocessor 96 to move blade 76 and block 78 towards each other and towards cable 12. At this stage, cable 12 has been moved vertically downward from its position for attachment of the last connector 14, whereby the top of last connector 14 is directly in line with the flat underside of cutting blade 76 (FIG. 6). As blade 76 moves toward block 78, cable 12 is cut at a precise point immediately above the last connector 14 on the cable, resulting in a flush, trim edge at the end of the cable 12 (FIG. 7). The detached cable 12, with connectors 14 attached, falls into a receptacle 108 (FIG. 5) beneath machine 10 where they are stored until needed. A sensor is actuated when the cable 12 is cut by block 76 to indicate to microprocessor 96 that one cycle of operation has been completed, and that a subsequent cycle should be initiated.

The above process is repeated until the predetermined number of assemblies of uniform length, with connectors 14 attached, are produced. Microprocessor 96 contains the program which will cease operation of machine 10 when the correct production quantity has been reached.

By way of example, the above-described machine 10 can be operated to produce cable assemblies at less than one second per connector, while cable is being fed at 48 inches per second, and the cutting step takes 0.5 seconds.

Through the use of microprocessor control 96, the operator can input the distance between connectors, the type and position of connector to be attached, the cut operation, and the total number of assemblies required. Additionally, the microprocessor 96 has the capacity to store programs for re-use, calculate number of connectors used of each type, length of cable used, length of cable remaining, number of assemblies completed, and number of assemblies to complete.

It will be apparent from the foregoing description that the method and apparatus of the present invention for producing cable assemblies provide a number of advantages, some of which have been described above and others of which are inherent in the invention.

Also it will be apparent that modifications can be made to the method and apparatus of the present invention without departing from the teachings of the present invention. Accordingly, the scope of the invention is only to be limited as necessitated by the accompanying claims.

I claim:

1. A method of forming cable assemblies comprising:
advancing a cable vertically downward a first selected distance;
attaching a first connector to the cable;
feeding the cable vertically downward a second selected distance;
attaching a second connector to the cable;
feeding the cable vertically downward a third selected distance; and,
attaching a third connector to the cable.

2. A method of attaching electrical connector parts to an electrical cable, the method comprising:
providing a supply of connector parts;
receiving individual connector parts from the connector part supply in a connector part receiving member;
advancing the connector part receiving member into contact with a portion of the cable and staking the connector part thereto; and,
selectively repeating the connector part receiving and staking steps to stake a plurality of connector parts to the cable.

3. A method of attaching a plurality of types of connectors to an electrical cable, the method comprising:
advancing the cable;
receiving a first type of connector in a first connector staking member;
advancing the first connector staking member toward the cable and staking the first type of connector thereto;
bringing the cable and a second staking member into an adjacent relatioship;
receiving a second type of connector in the second staking member; and
advancing the second staking member toward the cable and staking the second type of connector thereto.

4. A method for continuously and automatically forming cable assemblies, each cable assembly comprising a precise length of flat multiconductor cable upon which may be attached at least one connector at at least one precise location thereon, said method comprising the steps of:
(a) Under the control of a computer means, precisely advancing the cable longitudinally a selected length from a cable supply means;
(b) under the control of the computer means, translating the cable supply means transversely among connector attachment and cutting stations;
(c) repeating steps (a) and (b) under control of the computer means in accordance with a selected length and a selected connector placement for a selected cable assembly;
(d) cutting the flat, multiconductor cable at a portion thereof that defines an end of the flat, multiconductor cable to achieve a precise length cable assembly; and,
(e) repeating steps (a) through (d), whereby a plurality of multiconductor cable assemblies of the same or different lengths and configurations are automatically formed.

5. The method according to claim 4, further comprising the step of attaching a connector to a portion of the cable at one of the connector attachment stations.

6. A method for continuously and automatically forming multiconductor cable assemblies, the method comprising:
intermittently advancing a length of multiconductor cable longitudinally;
sequentially translating the cable length transversely among a plurality of connector stations;
at the connector stations, sequentially attaching a plurality of connectors to the cable length at different portions thereof; and,
cutting the cable length to define a terminal end thereof.

7. A method for continuously and automatically forming cable assemblies, each cable assembly including a precise length of multiconductor cable upon which may be attached at least one connector at at least one precise location thereon, said method comprising:
selectively translating a cable supply means in a direction generally transverse to a longitudinal length of the multiconductor cable to position the multiconductor cable adjacent at least one connector attachment station;
selectively and intermittently advancing the multiconductor cable to position selected portions of the multiconductor cable adjacent the at least one connector attachment station;
attaching a plurality of connectors to the multiconductor cable at different ones of the selected portions thereof; and,
cutting the multiconductor cable to define an end of the cable to achieve a precise length cable assembly.

8. The method according to claim 7 wherein said step of translating the cable supply means comprises translating the cable supply means to a cutting station where said step of cutting is carried out.

9. The method according to claim 8 wherein said step of translating the cable supply means comprises translating the cable supply means adjacent another connector attachment station; said step of advancing the cable comprising positioning a portion of the cable adjacent the another connector attachment station; and attaching a second connector at the another connector attachment station before said step of cutting the cable.

10. A method for continuously and automatically forming multiconductor cable assemblies, said method comprising:
intermittently advancing the multiconductor cable under automatic machine control from a reel of multiconductor cable selected distances in a vertical direction;
intermittently translating the reel of multiconductor cable horizontally under automatic machine control to position selected intermediate and end portions of the cable adjacent selected connector attachment stations; and,
automatically under machine control, attaching at least one connector to at least one of the selected intermediate and end portions of the cable positioned at the connector attachment stations, whereby a cable assembly having at least one connector attached intermediately thereto is produced.

11. The method according to claim 10, further comprising the step of initially cutting the multiconductor cable to establish a forward edge of a cable assembly.

12. The method according to claim 11, further comprising the step of cutting the multiconductor cable after at least one connector has been attached to at least one selected portion of the cable to define a trailing end of the cable assembly; said step of advancing the cable being carried out between the step of cutting and the step of attaching, and between each step of attaching.

13. The method according to claim 10, wherein said step of intermittently translating the cable supply is performed between steps of attaching, so as to allow attachment of at least one connector at each of the connector attachment stations.

14. An apparatus for automatically forming cable assemblies, each cable assembly including a selected length of cable with at least one connector attached thereto, the appartus comprising:

a cable supply support assembly mounted on a track member for translating movement therealong;

a cable supply means for storing and feeding cable therefrom, the cable supply means being mounted on the cable supply supporting assembly such that the cable feeds vertically downward therefrom;

a cable advancing means for advancing the cable vertically downward from the cable supply means, the cable advancing means being mounted on the cable supply support assembly vertically below the cable supply means;

a translating means for selectively translating said cable supply supporting assembly along the track member, the translating means being operatively connected with the track member;

a plurality of connector attaching means each operatively connected with the track member for attaching a selected type of connector to the cable, the connector attaching means being stationarily mounted in a generally horizontal array and vertically below the cable supply means and the cable advancing means such that translating the cable supply supporting assembly along the track member selectively positions the cable adjacent each of the connector attaching means; and, control means for selectively causing the translating means to translate the cable supply supporting assembly to preselected positions along the track member such that the cable is selectively disposed adjacent a selected one of the connector attaching means, for controlling the advancing means for selectively controlling advancement of the cable, and for controlling the connector attaching means for selectively causing attachment of selected types of connectors at selected locations along the cable.

15. The apparatus according to claim 14 further including a cutting means for selectively cutting the cable, the cutting means being mounted among the generally horizontal array of connector attaching means, the cutting means being operatively connected with the control means to be selectively actuated thereby to cut the advanced cable to selected lengths.

16. The apparatus according to claim 14 wherein the advancing means includes a pair of rollers forming a nip therebetween for passage of the cable therethrough and a drive motor operatively connected with at least one of the rollers for supplying rotational force thereto.

17. The apparatus according to claim 14, wherein said cable supply means comprises a reel having the cable wound therearound.

18. The apparatus according to claim 16, further comprising a pre-programmed microprocessor which controls the operation of said drive motor; said translating means including drive means for translating said cable supply support assembly, said pre-programmed microprocessor also controlling the drive means, so that various lengths of cable may be assembled with different types of connectors.

19. The apparatus according to claim 14, further comprising at least one cutting station for cutting the cable at a desired location to initially cut the cable to form a clean cut first end and to cut the cable after a last connector has been attached to form a clean cut second end; said at least one cutting station being operatively mounted adjacent said connector attaching means.

20. An apparatus for forming flat, multiconductor cable assemblies, the apparatus comprising:

a main frame assembly;

a cable supply means for storing and feeding flat, multiconductor cable;

a cable supply supporting means supported by said main frame assembly for horizontal translating movement relative thereto;

an advancing means operatively associated with said cable supply means for advancing cable from said cable supply means in a vertically downward direction;

a translating means operatively connected with the main frame assembly for translating said cable supply supporting means horizontally relative to the main frame assembly;

an array of work stations mounted to the main frame assembly in a horizontally spaced relationship vertically below the cable supply supporting means;

a microprocessor for controlling the advancing means to advance selected lengths of multiconductor cable, for controlling the translating means to translate the cable supply means into vertical alignment with selected ones of the work stations in any of a plurality of selectable sequences such that a selected cable portion is disposed adjacent each selected work station, and for controlling each selected work station to operate on the portion of the multiconductor cable positioned thereadjacent.

21. The apparatus according to claim 20, wherein the work stations include a plurality of means for attaching a plurality of types of connectors to portions of cable; each of said means for attaching connectors being positioned so that the flat, multiconductor cable is directed theretowards by said cable advancing means.

22. The apparatus according to claim 20, wherein the work stations include a cutting means for cutting the advanced multiconductor cable at a selected portion thereof.

23. An apparatus for attaching two-piece connector blocks to a multiconductor, ribbon cable, the apparatus comprising:

a main frame assembly which defines a passage for the movement of a ribbon cable therethrough;

a first magazine for storing a plurality of first connector block halves and a second magazine for storing a plurality of second connector block halves, the first and second magazines being supported by the main frame assembly on diametrically opposite sides of the cable receiving passage;

first and second reciprocating connector block attachment members, the first and second reciprocating attachment members being operatively supported by the main frame assembly for reciprocating movement between a connector block half receiving position and a generally abutting relationship with each other, the first reciprocating member including a first connector half retaining means and being mounted to reciprocate adjacent the first magazine to receive first connector block halves therefrom in its receiving position; and the second reciprocating member including a second connector half retaining means and being mounted to reciprocate adjacent the second magazine to receive second connector halves therefrom in the second position.

24. An apparatus for forming cable assemblies, the apparatus comprising:

a main frame assembly;

a cable supply means for storing and feeding cable;

an advancing means operatively associated with the cable supply means for selectively advancing selected lengths of cable vertically downward therefrom;

a plurality of connector attachment stations for selectively attaching connectors to cable received thereadjacent, the attachment stations being operatively connected in an array along the main frame assembly below the advancing means to receive cable advanced therefrom; and, a translating means opertively connected with the main frame assembly for intermittently translating at least the advanced cable horizontally for selectively positioning the advanced cable adjacent each of the connector attachment stations.

25. An apparatus for attaching electrical connector parts to a cable, the apparatus comprising:;

a connector part magazine for selectively supplying connector parts therefrom;

a connector part retaining member for selectively retaining a connector part therein, the connector part retaining member being operatively connected with the connector part magazine for reciprocating displacement relative thereto;

reciprocating means operatively connected with the connector part retaining member for reciprocating the connector part retaining member relative to the connector part magazine at least between a connector part receiving position and a connector part attaching position for attaching the connector parts with the cable, the reciprocating connector part retaining member being disposed adjacent the magazine in the connector part receiving position to receive connector parts therefrom, whereby the reciprocating connector part receiving member receives a connector part from the magazine and advances the connector part toward the connector part attaching position and attaches the connector part to the cable.

* * * * *